Figure 6:
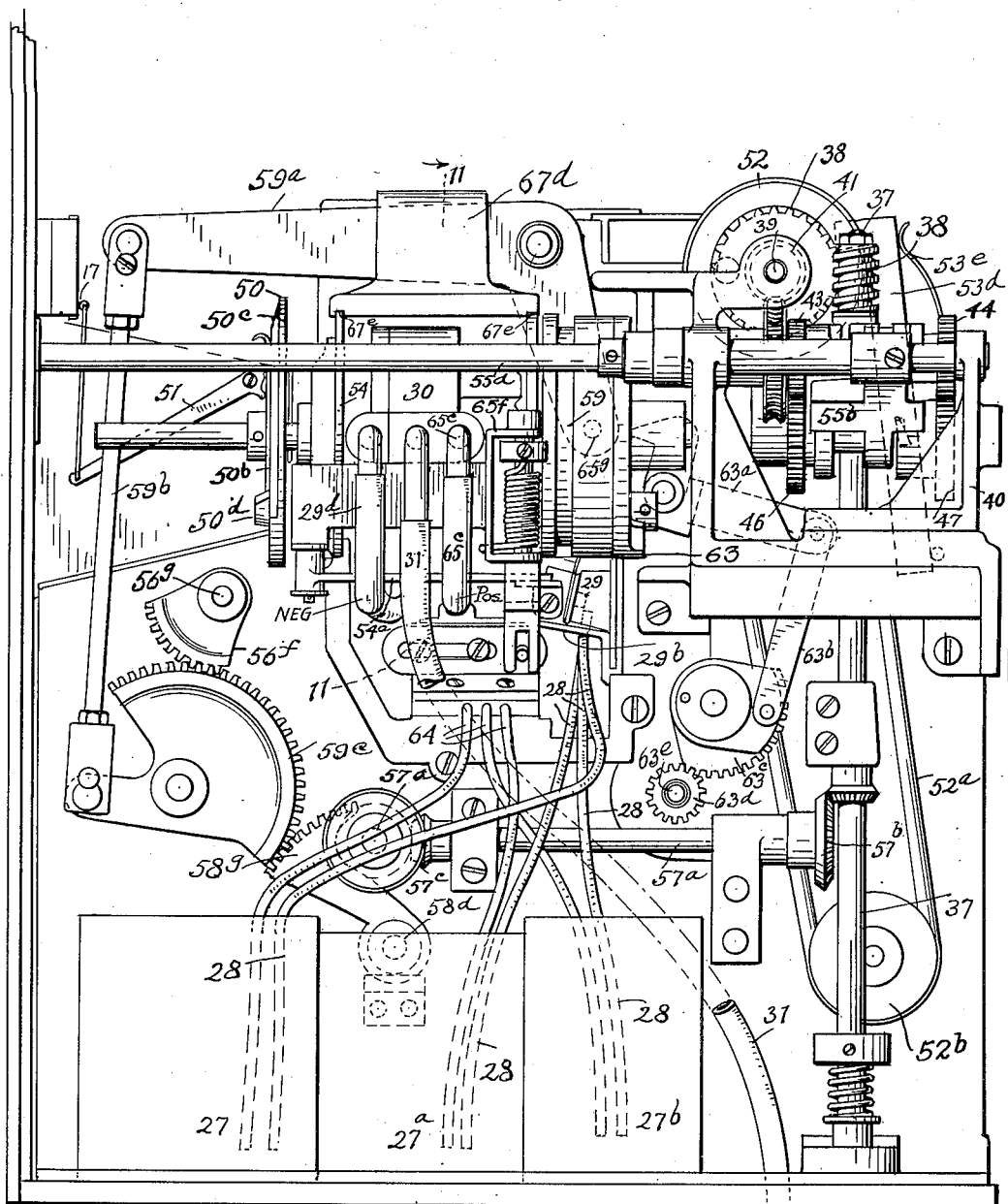

Sept. 4, 1928.
G. N. PIFER
1,682,931
AUTOMATIC PHOTOGRAPHING MACHINE
Filed Dec. 31, 1924     10 Sheets-Sheet 1
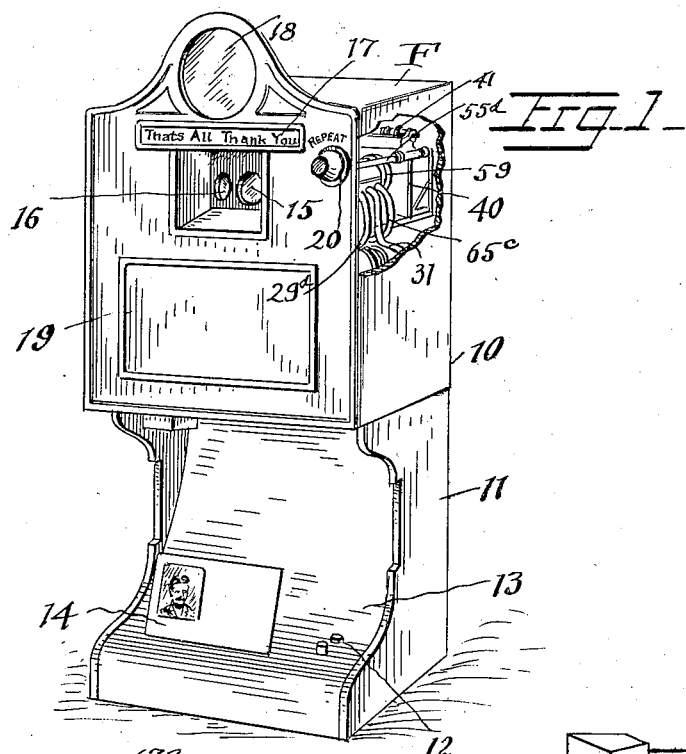
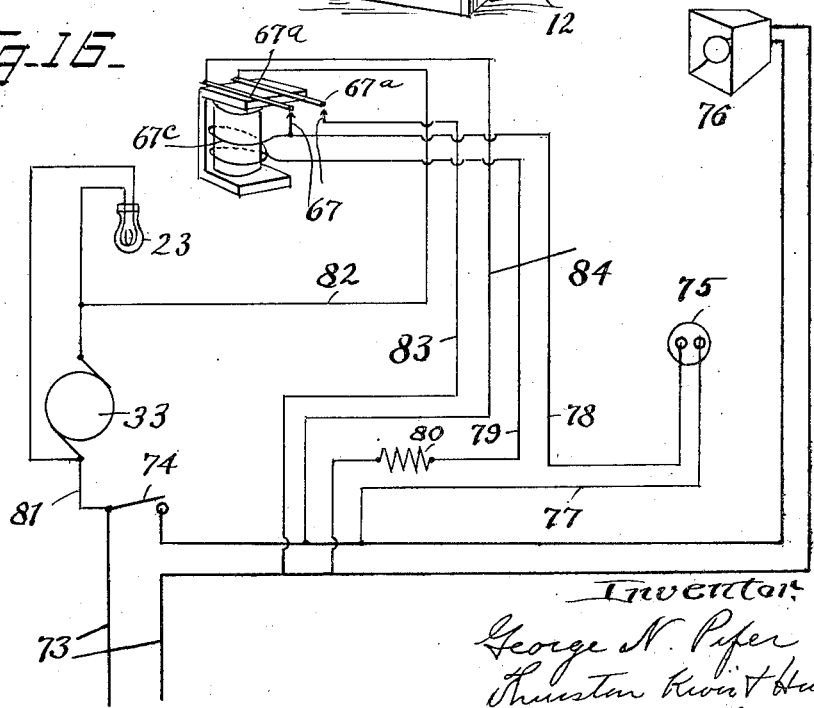

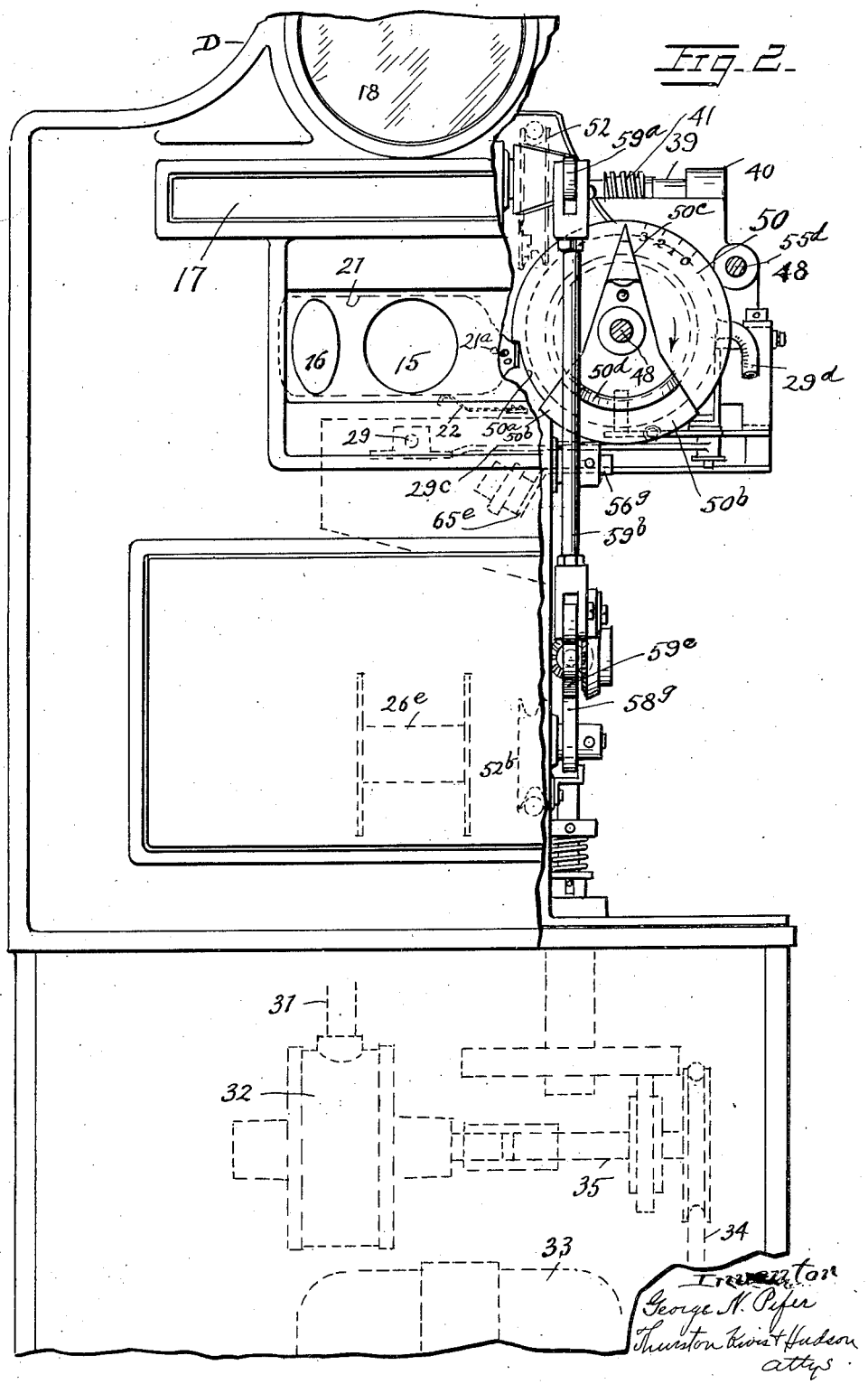

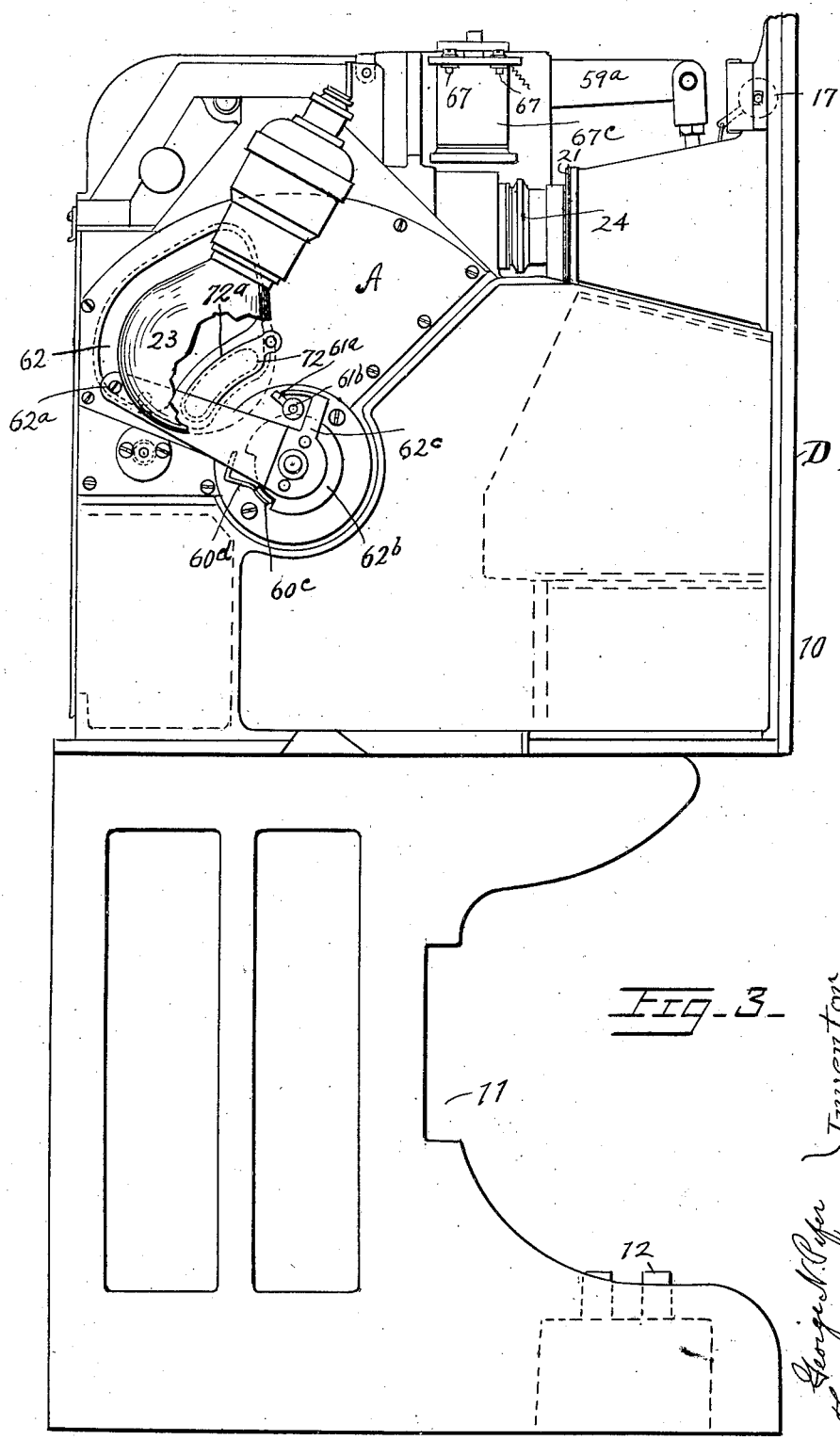

Sept. 4, 1928.
G. N. PIFER
1,682,931
AUTOMATIC PHOTOGRAPHING MACHINE
Filed Dec. 31, 1924   10 Sheets-Sheet 4
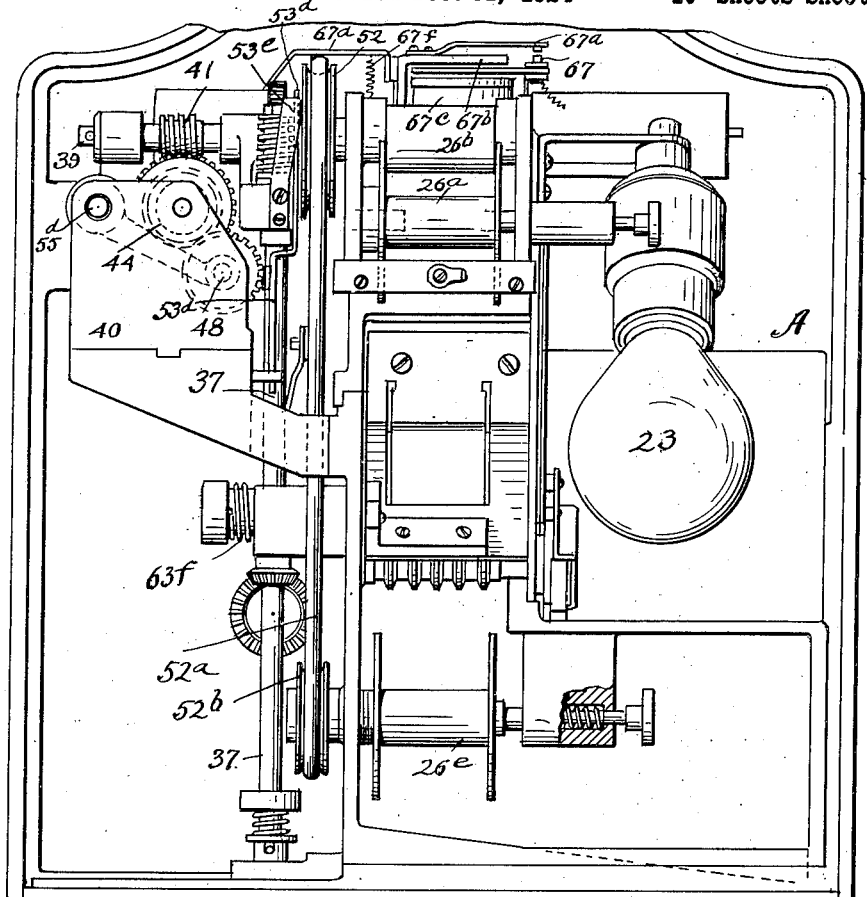
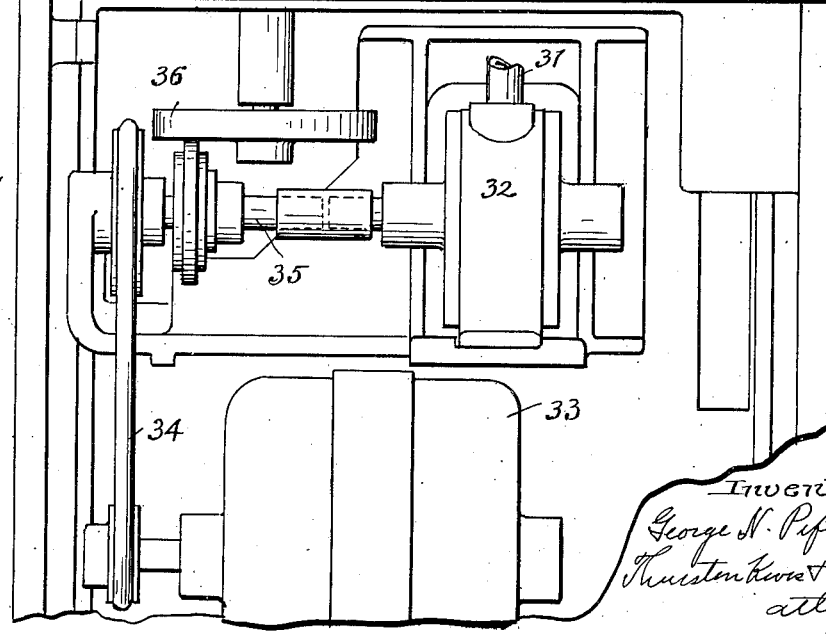

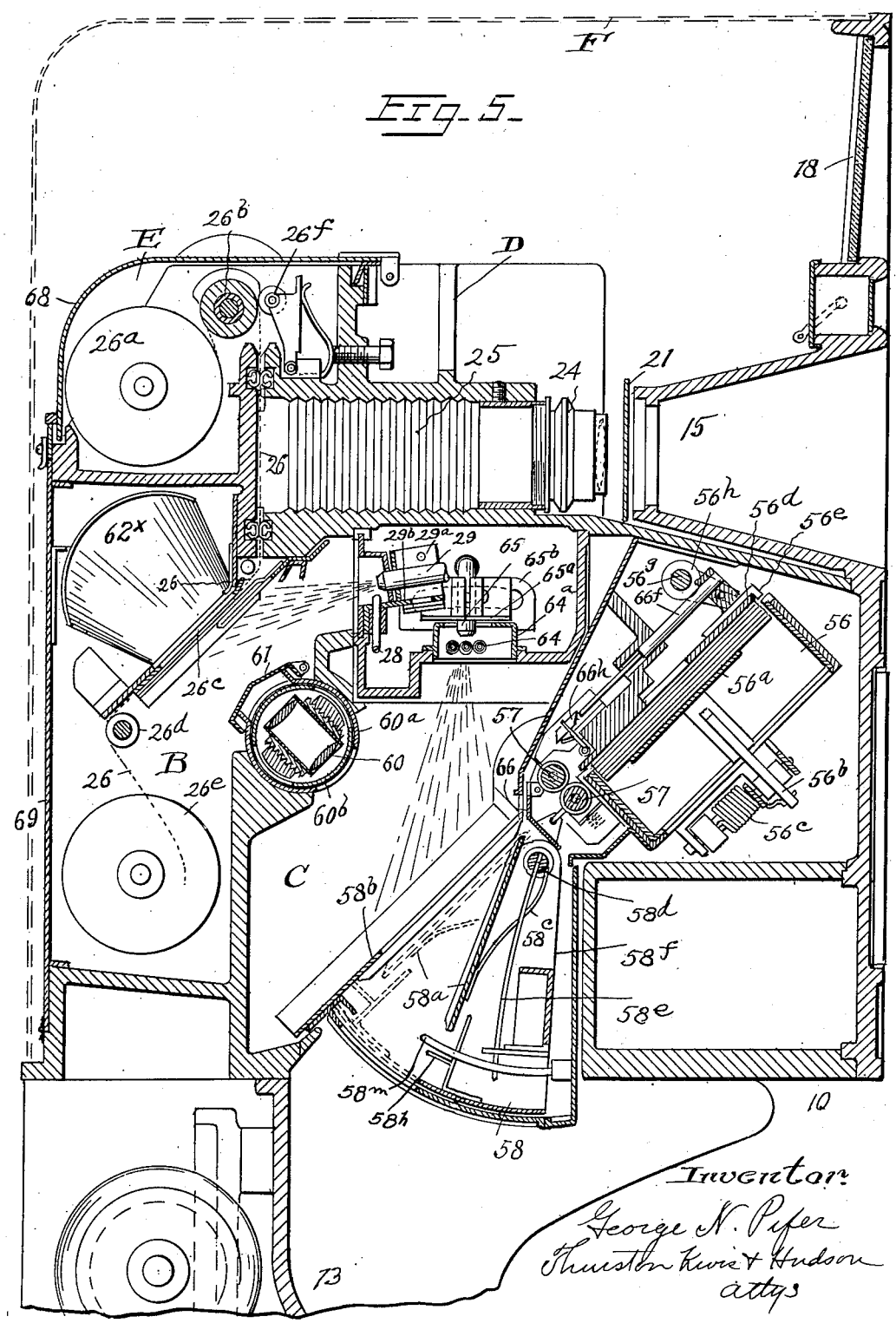

Sept. 4, 1928.

G. N. PIFER 1,682,931

AUTOMATIC PHOTOGRAPHING MACHINE

Filed Dec. 31, 1924    10 Sheets-Sheet 6

Inventor:
George N. Pifer
Thurston Kwis & Hudson
attys

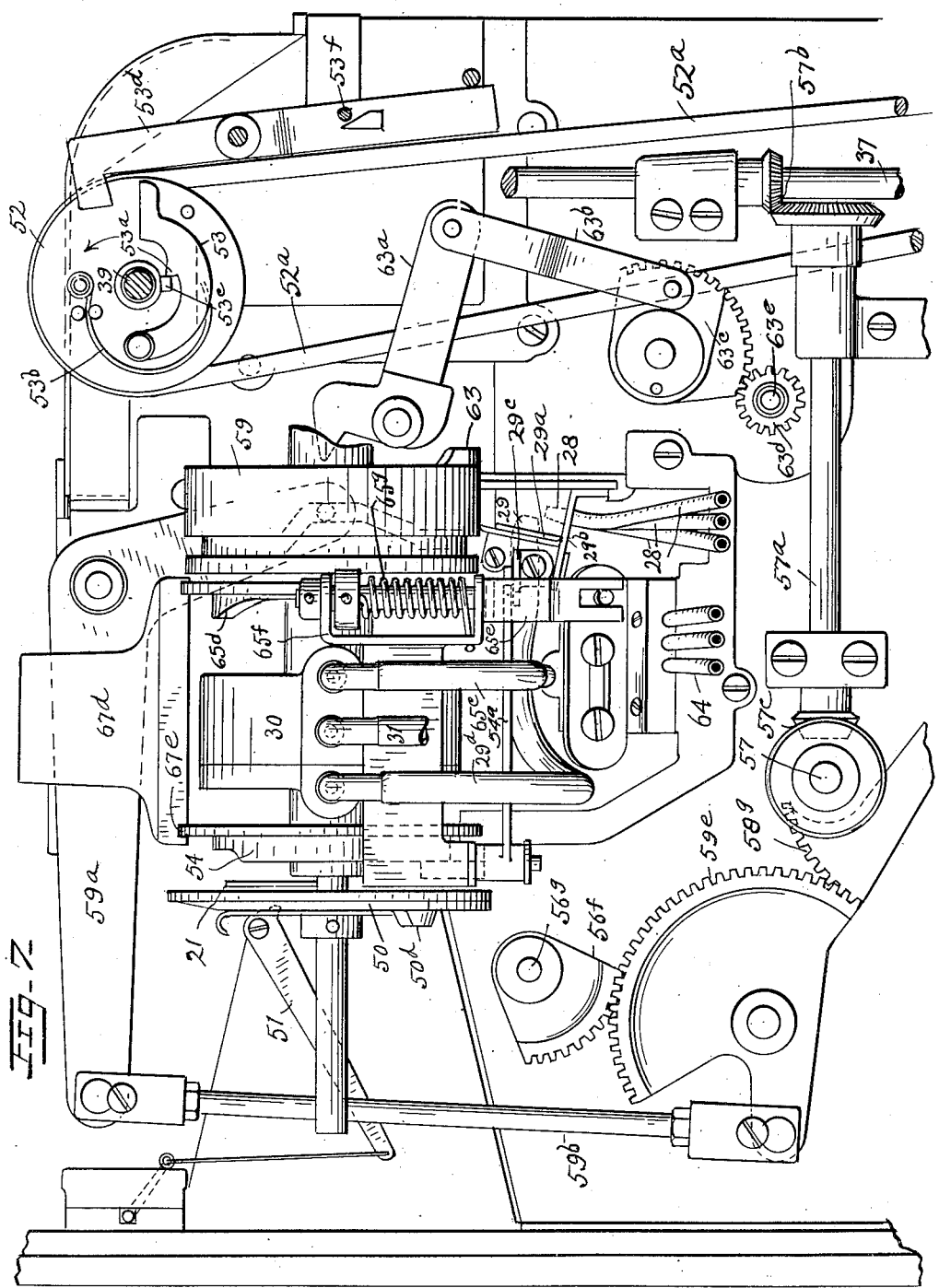

Sept. 4, 1928. 1,682,931
G. N. PIFER
AUTOMATIC PHOTOGRAPHING MACHINE
Filed Dec. 31, 1924 10 Sheets-Sheet 8
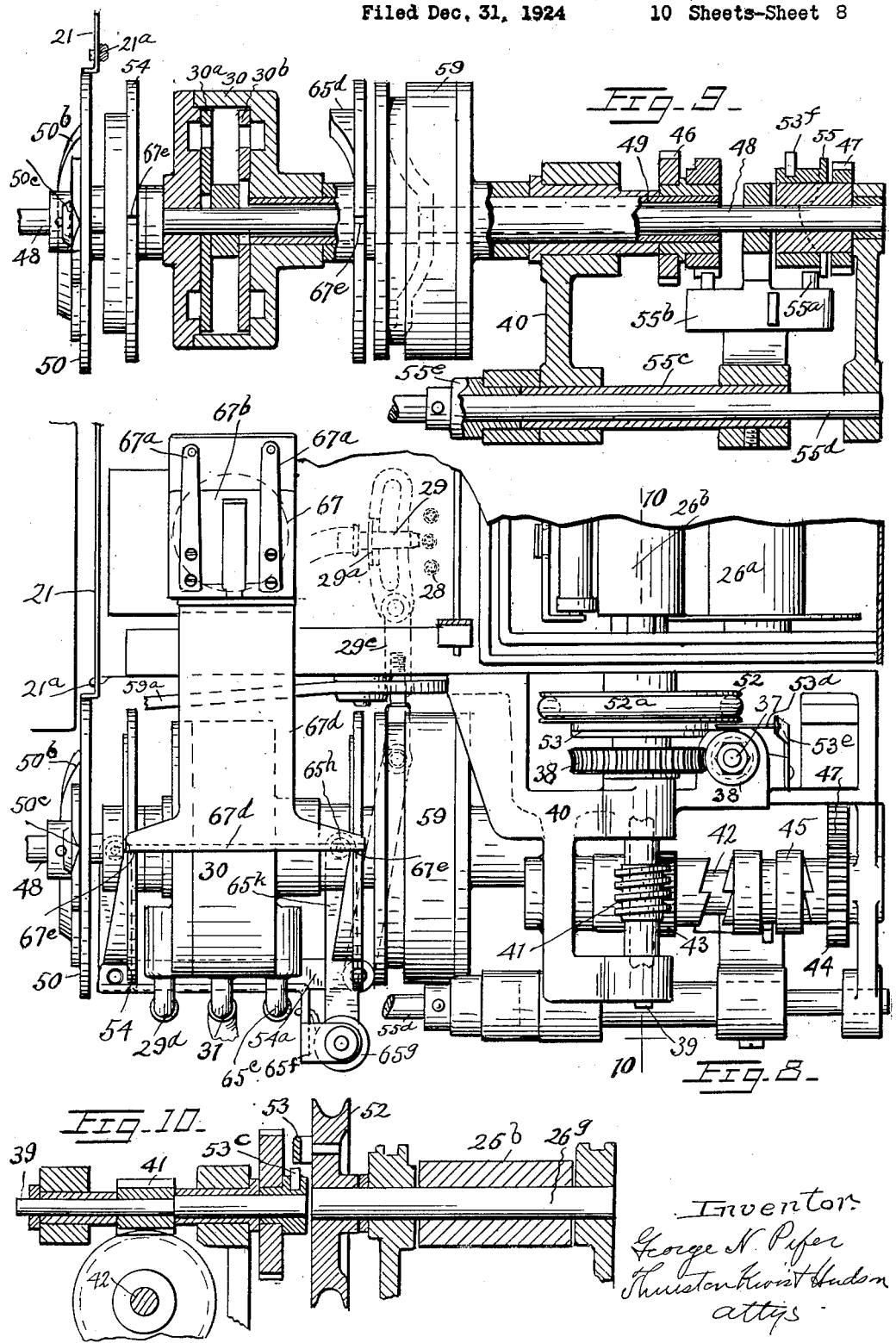

Sept. 4, 1928.
G. N. PIFER
1,682,931
AUTOMATIC PHOTOGRAPHING MACHINE
Filed Dec. 31, 1924   10 Sheets-Sheet 9
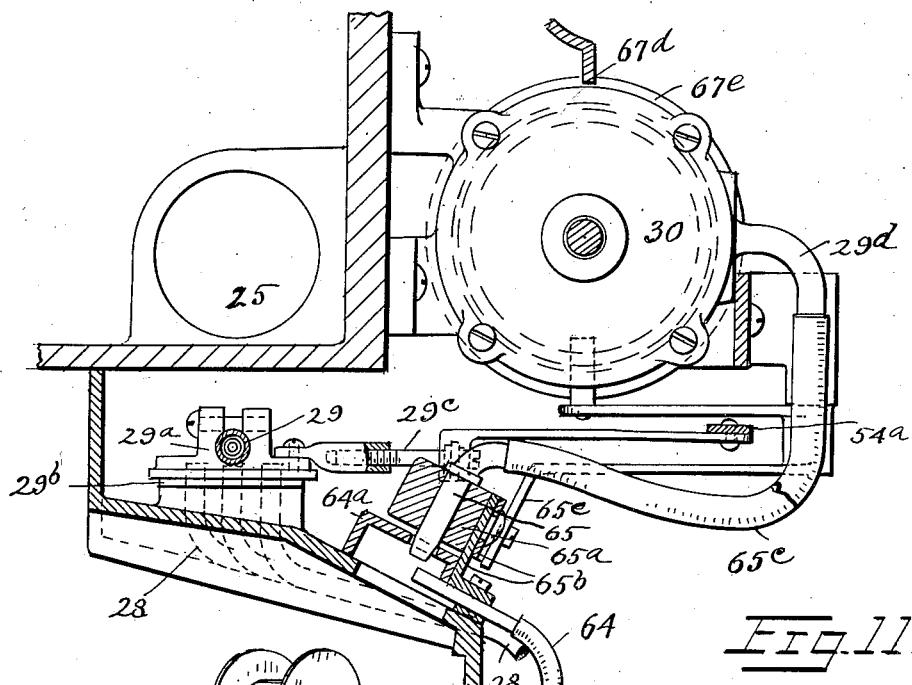
Fig.11.
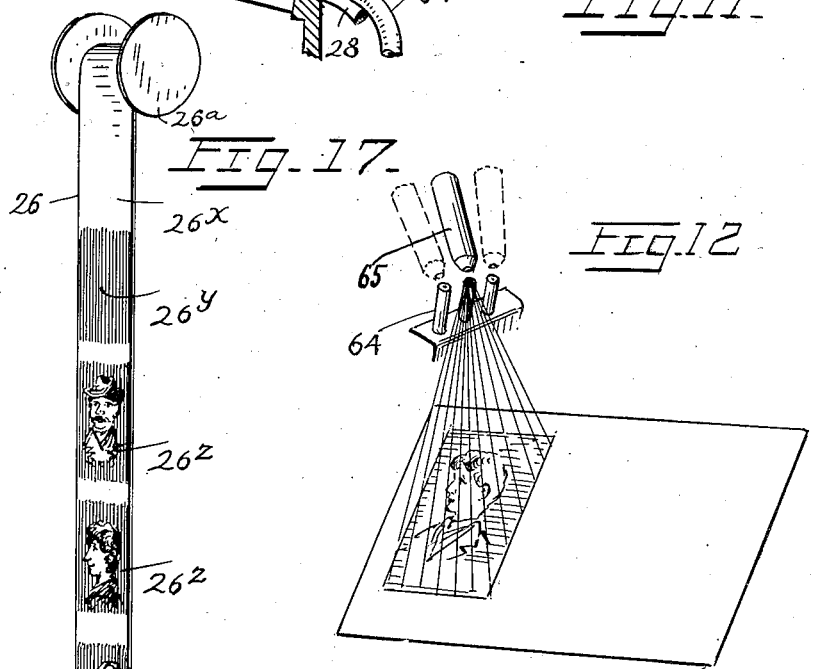
Fig.17.
Fig.12.
Inventor
George N. Pifer
Thurston Kiwis & Hudson
atty Sept. 4, 1928.
G. N. PIFER
AUTOMATIC PHOTOGRAPHING MACHINE
1,682,931
Filed Dec. 31, 1924   10 Sheets-Sheet 10
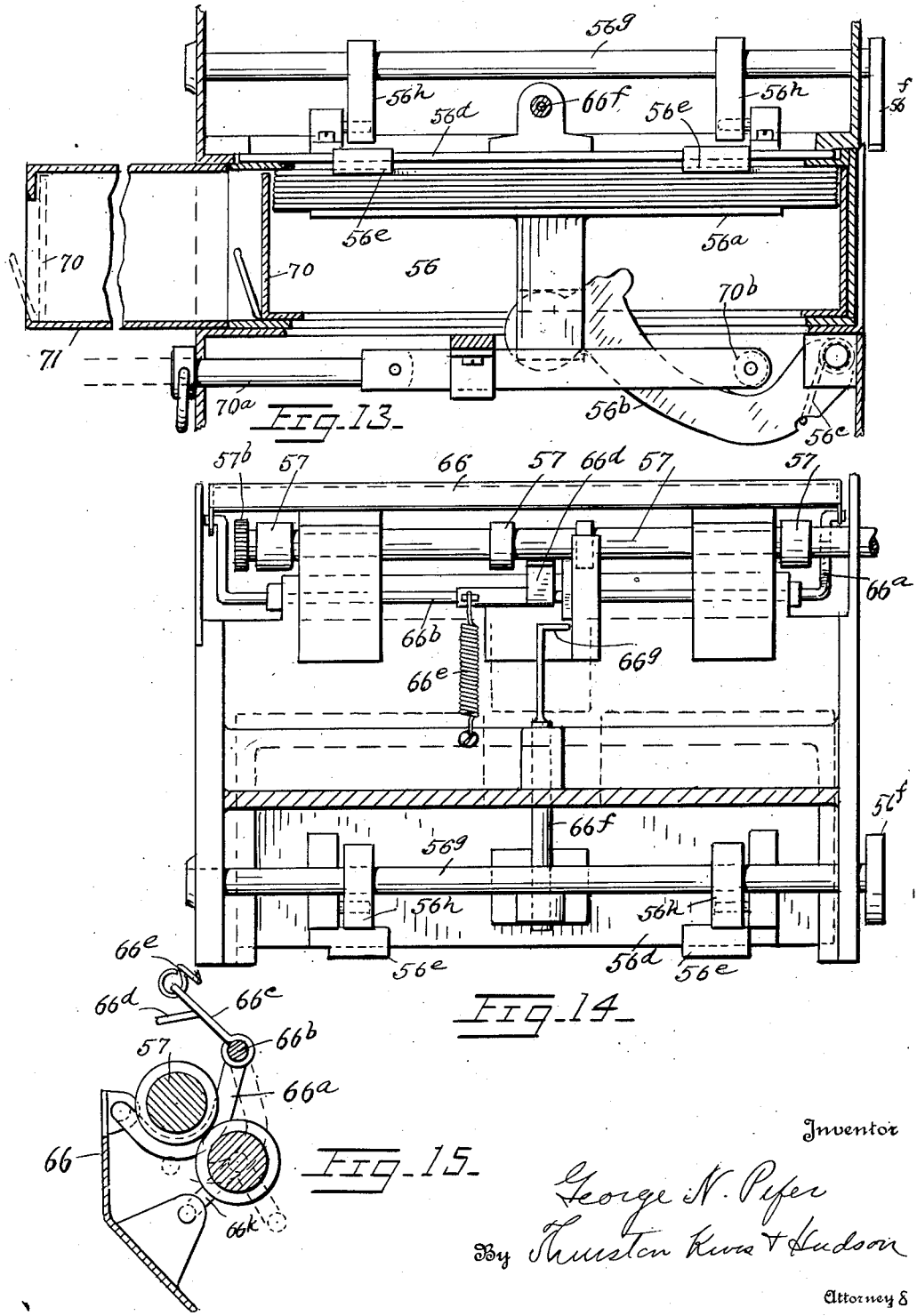
Inventor
George N. Pifer
By Thurston Kivas & Hudson
Attorneys Patented Sept. 4, 1928.

1,682,931

UNITED STATES PATENT OFFICE.

GEORGE N. PIFER, OF CLEVELAND, OHIO, ASSIGNOR, BY MESNE ASSIGNMENTS, TO AMERICAN PHOTOTURE COMPANY, OF NEW YORK, N. Y., A CORPORATION OF DELAWARE.

AUTOMATIC PHOTOGRAPHING MACHINE.

Application filed December 31, 1924. Serial No. 758,989.

This invention relates to automatic photographing apparatus, and has for its chief object to produce a machine of this character, which is efficient and rapid in operation.

Further the invention aims to provide a machine which will produce unreversed photographs by first forming the negative, and from the latter, the positive, with the necessary steps of developing, washing and fixing, all automatically produced in a short space of time.

A further object is to provide an automatic machine by which duplicate positives may be produced from the negative, with provision for producing as many positives as may be desired, and one after the other in rapid order, each picture being properly developed and fixed before being delivered from the machine.

A still further object is to provide a machine of this character, capable of using transparent film or sensitized paper for the production of the negative images, together with means whereby each positive image appears on a localized area of the card or other device upon which the photographs are to be produced.

A still further object is to provide an efficient and rapidly operating method and mechanism for developing, washing and fixing negative and positive images, the same being preferably accomplished by atomized or vaporized solutions instead of by the immersion process heretofore employed so as to permit a localized developing manipulation without affecting any other area of the card or other support which is to carry the positive picture.

A still further object is to provide not only an efficient machine for carrying out the objects above stated, or for producing the results named above, but also one which is reliable in operation and compact so as to occupy relatively little space.

All the above objects are attained in a very effective manner by the machine constituting the subject matter of the present invention, which may be here briefly summarized as consisting in certain novel combinations and arrangements of parts, and details of construction which will be described in the specification and set forth in the appended claims.

In the accompanying sheets of drawings wherein I have shown the preferred embodiment of the invention, Fig. 1 is a perspective view of the machine showing the exterior thereof, a portion of which is broken away; Fig. 2 is a front view on an enlarged scale, portions being broken away; Fig. 3 is a side view looking toward the left hand side of Fig. 1, with the side wall or cover removed; Fig. 4 is a rear view with the top and rear part or cover of the box or casing removed to show the interior mechanism; Fig. 5 is a central, vertical, sectional view omitting the lower part; Fig. 6 is an enlarged side view showing the interior mechanism as viewed from the side opposite to that shown in Fig. 3, or looking toward the right hand side of Fig. 1; Fig. 7 is an enlarged view similar to Fig. 6, with parts removed for the sake of clearness; Fig. 8 is a top plan view of the mechanism shown in Fig. 7, with a portion broken away; Fig. 9 is a fragmentary sectional plan view of a part of the mechanism; Fig. 10 is a sectional view substantially along the line 10—10 of Fig. 8, looking in the direction indicated by the arrows; Fig. 11 is a sectional view substantially along the line 11—11 of Fig. 6, showing particularly the atomizing nozzles employed for the developing, washing and fixing operations; Fig. 12 is a diagrammatic view further illustrating the atomizing operations referred to above; Fig. 13 is a sectional view through the card magazine, illustrating the manner in which the magazine is adapted to be filled; Fig. 14 is a sectional plan view looking down on Fig. 13; Fig. 15 is a detail sectional view through the feed rolls for the cards and protective shield associated therewith; Fig. 16 is a diagram of electric circuits; and Fig. 17 shows conventionally a portion of the continuous strip that is fed through the camera and on which the negative images are produced.

The machine which I have illustrated in the above mentioned figures of the drawings, and will describe below, is electrically operated through manual control, preferably of two switches, the first of which is operated by the attendant, and the second by the subject whose photograph is to be taken, this last mentioned switch being within convenient reach of the subject so that it may be closed or operated when the subject is ready to have his or her picture taken. It is not essential, however, that the machine be controlled in this manner, and, in fact, I contemplate having the same machine coin-controlled, in which event the mechanism will be set into operation by the introduction of a coin, or first by the introduction of a coin, and subsequently by the closure of a switch by the subject.

As I have constructed and arranged the apparatus, the operating mechanism is arranged in a cabinet, which I have illustrated in Fig. 1, the operating mechanism itself being in a closed case 10, on a stand 11 at the lower front part of which I have illustrated a switch 12. This stand also involves a delivery guide-way 13, down which the photographs slide from the bottom of the case 10, one photograph being illustrated after its delivery from the case 10, at 14.

Near the upper part of the case 10 is a lens recess 15, and beside this, a second recess 16 for a signal light which indicates to the subject the closure of the shutter. Above this is a movable indicator 17, bearing suitable directions, this indicator being operated simultaneously with the closure of the shutter and the closure of the indicating light opening 16 to inform the operator that the exposure is completed, this indicator 17 being automatically operated along with the indicating light, as will be explained presently.

Above the member 17, I provide a mirror 18, and below the lens and light indicating openings 15 and 16, a suitable direction plate 19 may be provided. The above details are not essential to the invention, but they are important inasmuch as they add to or enhance the practicability of the machine, reduce the liability of errors, and by reason of the fact that the signaling parts are incorporated in, or made a part of the machine and are operated by the mechanism used in operating the shutter, instead of being arranged on a more or less remote part of the machine, the feature of compactness is attained to a very high degree.

Additionally, at the front of the machine there is a knob or button 20, which either the attendant or subject may operate when duplicate photographs are desired. The purpose of this and the manner in which the duplicating feature is carried out will be explained presently.

Before describing in detail the operating mechanism of the machine, the sequence of operations will be given. On the closure of the circuits by the switches referred to, an electric motor is started and a lamp in the casing is lighted, the function of the motor being to operate the various parts, and the lamp being primarily for the purpose of forming the positive picture from the negative, and secondarily, as a source of light for the signal opening 16. Preferably an external lamp is lighted also while the exposure is taking place, this lamp giving the light to form the negative.

On the starting of the motor the shutter is opened and held open for a given or predetermined time, and then closed. Incidentally the shutter opens and then closes the signal opening 16.

The negative is exposed while the shutter is open, the negative being formed in this instance (though not necessarily as will be subsequently explained) on a film which is in the form of a strip wound on a spool as in motion picture cameras. Immediately following the exposure, the film rolls are actuated so as to move the exposed portion of the film from the rear of the camera box, in line with the lens, to a lower inclined position which is the developing position.

Next, the exposed portion of the film is developed by directing the necessary atomized solutions in the form of sprays onto the film. The solutions thus directed onto the film are a developing solution, water for a wash, a fixing solution and again water for a wash. The solutions are atomized or aerated and directed onto the film by a stream of air delivered by a nozzle which is moved back and forth over the ends of delivery tubes for the solutions which are contained in receptacles mounted in the case, the air being delivered from a pump driven by the motor.

The negative now having been formed, the subsequent operations have to do with the forming of the positive picture. Next a card containing a localized, sensitized portion is delivered from a light-tight compartment and moved forwardly to a position for exposure, developing, fixing, etc. As soon as the card is in position, certain shutters are operated and the exposure is made on the card for the positive picture, the light passing from the lamp previously referred to, through the film and a lens onto the sensitized part of the card.

On the completion of the exposure operation by the closure of the shutters, the picture is developed and fixed in the same manner that the film was developed, i. e. by the delivery of the necessary solutions, in the form of sprays, onto the exposed portion of the card, the air being delivered from a movable nozzle passing over the ends of solution delivering tubes, as in the first instance.

At the next operation the card bearing the finished picture is delivered from the machine to the position indicated in Fig. 1, and following this, the electric circuits are automatically opened and the machine stopped.

In the event that duplicate copies are desired, it is only necessary to close the circuits by the operation of the switches, and the duplicate pictures are produced one after the other by the closure of the circuits following the delivery of each picture. In reproducing these pictures, each cycle of operations carried out in forming a picture is confined to the positive forming portion of the cycle previously enumerated.

If duplicate pictures are not desired, or when it is desired to produce an entirely new picture, the knob 20 is pushed inward, which operates a clutch, causing the entire cycle of operations to be gone through, including the original exposing on the film, the movement of the film, the developing thereof followed by the sequence of operations carried out in forming a positive picture.

I will now take up the details of construction. The shutter 21 (Figs. 2 and 5) is pivotally supported at 21ª, directly behind the lens opening 15 and signal opening 16. It is moved to open position by a spring 22 (Fig. 2) when permitted to swing upward by a cam disk, referred to presently. The lamp 23 (Figs. 3 and 4) constituting the source of light for forming the positive image and for directing light through the signal opening 16, is in a compartment A (Fig. 4) of the case 10 at one side of the film compartment B (Fig. 5) and to the rear and slightly above the compartment C (Fig. 5) in which the exposure, developing, fixing, etc., for the positive picture are carried out. The compartments B and C are formed in a cast framework D which is mounted in the case 10 behind the fixed front thereof. The top, rear and sides of the case are formed by a cover F, which is shown removed in all the figures except Fig. 1. Compartment A is formed between one side of the framework D and the cover referred to. The framework D also forms a support for the major part of the operating mechanism.

At the rear of the shutter 21 is a lens mounted in a lens holder 24 at the forward end of a camera box 25, through the rear of which the film, indicated at 26, is adapted to be moved in a vertical direction. The film is unwound from a spool 26ª in a compartment E at the upper rear part of the case 10, passes around a feed roller 26ᵇ, then downwardly through slots at the rear of the camera box 25, then downwardly and rearwardly through a film chute 26ᶜ which is inclined downwardly and rearwardly as shown in Fig. 5, then around an idler 26ᵈ beneath the film chute, and around a take-up roll or spool 26ᵉ in the lower part of compartment B.

When the film is actuated, the exposed section is moved from the rear of the camera box to the film chute where the developing takes place.

The solutions used in developing, washing and fixing the negative, and for developing, washing and fixing the positive picture are contained in three receptacles which may be in any suitable part of the case. These receptacles are indicated at 27, 27ª and 27ᵇ in Fig. 6, one of these receptacles containing the developing solution, another the washing solution, and a third the fixing solution. Two sets of tubes extend from these receptacles, one for use in developing, washing and fixing the negative, and the other for developing, washing and fixing the positive. The tubes used in delivering the solutions for forming the negative are indicated at 28 (Figs. 5, 6 and 7). The upper ends of these tubes 28 are held in fixed vertical position, close together, one of these tubes being indicated in Fig. 5. These tubes are forwardly of the exposed portion of the film, while in the film chute, and slightly above the same, as indicated in Fig. 5. For atomizing these solutions and directing them successively onto the film, a stream of air from an air nozzle 29 is moved back and forth over the ends of the tubes, the nozzle being actuated, as will be presently explained, not only to atomize and aerate the solution supplied by each tube, but to direct it against the inclined surface of the film, as indicated in Fig. 5. The spray of the developing solution plays on the film for the right period, and then the nozzle is moved over the water tube, and a spray of water which washes the film is directed onto the latter. Then a spray of fixing solution is directed onto the film, followed again by a spray of water to wash the film. In this manner not only is the film effectively developed, washed and fixed, but the entire developing operation including the washing and fixing is performed very quickly, inasmuch as the solutions are rapidly and automatically carried away from the film, and furthermore, the action of the solutions is greatly accelerated by reason of the fact that they are atomized, which is responsible for a much quicker chemical action or oxidation than with the immersion process. A further advantage in the use of this process, as distinguished from the ordinary immersion process, is the fact that the solutions can be localized, this being, however, particularly important in the production of the positive picture inasmuch as it permits the use of cards or other blanks containing sensitized portions placed or localized in any desired position and covering any desired portion of the card.

The air nozzle 29 is mounted in a holder 29ª supported on a shelf 29ᵇ, and adapted to be moved back and forth over the same, the shelf having an arcuate slot in its base so that as the nozzle is moved back and forth over the ends of the tubes 28, the spray solutions will be blown directly onto the films and always from the proper direction. The holder 29ª has connected to it a cam-actuated link 29ᶜ (Figs. 8 and 11) which is moved horizontally in and out by a cam mechanism to be referred to.

Air is delivered to air nozzle 29 by a tube 29ᵈ (Figs. 6 and 7) extending from a casing 30 of a valve, (Figs. 6 and 9). This valve, which is in effect a double valve, controls the delivery of air from the casing 30 to the air nozzle used in developing the positive picture as well as to the air nozzle used in developing the negative. The air is supplied to the valve casing 30 by a tube 31 (Fig. 6) connected to an air motor 32 (Fig. 4) located in the stand beneath the case 10.

The parts above described, instrumental in forming the negative, and the parts which are actuated in producing the positive picture may be operated from the motor by many specifically different forms or trains of devices, but in the drawings I have illustrated one form or embodiment which operates with high efficiency. An electric motor 33, which constitutes the source of power for all the moving parts of the machine, is located in the lower rear part of the stand 11 (Figs. 2 and 4). This motor is connected by a belt 34 to a horizontal shaft 35 which drives the rotor of pump 32, this shaft being connected by a friction drive mechanism 36 to a vertical shaft 37 which is connected by worm gearing 38 to a horizontal shaft 39 supported in a frame 40 (forming a continuation of frame D) in the upper rear part of the case 10. This shaft 39 (Figs. 2, 4, 6 and 8) is in line with, and adapted to be clutched to the shaft of the film feed roll 26$^b$ (Fig. 10). Additionally, the shaft 39 is connected by worm gearing 41 (Figs. 4 and 8) to a shaft 42 carrying two gears 43 and 44 (Figs. 6 and 8), either of which is adapted to be clutched to shaft 42 by a movable clutch member 45. These two gears engage respectively, two gears 46 and 47, the latter being fixed to an inner shaft 48 (Fig. 9) and the former to a hollow or outer shaft 49 (Fig. 9). The inner shaft 48 either directly actuates or controls the movement of all parts utilized in forming the negative, this shaft being rotated during that portion of the cycle of operations in which the negative is formed. The outer or hollow shaft 49 either directly actuates or controls all the parts utilized in forming the positive, and is rotated when the positive is being formed. The two shafts 48 and 49 are driven alternately by the automatic movement of clutch member 45, one being stationary while the other is moving, except for a brief interval to be referred to, when both shafts are moved together, when the clutch member is partially disengaged from gear 44 and is partly engaged with gear 43.

When the machine is started up to produce a picture, clutch member 45 will be in its right-hand position, as shown in Fig. 8, so that when the motor is started on the closure of the switches this shaft begins to rotate. The shaft 48 is provided near its forward end with a cam disk 50 for operating the shutter 21 (Figs. 2, 6 and 9). The disk is provided on its periphery with a notch 50$^a$, and the shutter is provided beyond its pivot 21$^a$ with an extension which normally engages the periphery, in which event the shutter is held closed. When, however, the disk is rotated to the point that the extension of the shutter can drop into this notch, the shutter is opened by spring 22, and remains open until it is engaged by a shoulder or abutment on an adjustable timing member 50$^b$ which moves with the disk 50, but can be adjusted around shaft 48 to vary the length of the slot or notch which determines the length of the exposure. This adjustable member 50$^b$ is provided with a pointer 50$^c$, adapted to move over a portion of the disk graduated in seconds, so as to indicate by its position the length of exposure.

The adjustable member 50$^b$ carries on its face a cam 50$^d$, which at the instant that the shutter closes, rocks a lever 51 connected to the movable indicator 17 (Figs. 1, 6 and 7) to a position such as to notify or inform the subject that the exposure period is over.

Next the shaft 48 shifts the film to bring the exposed portion into the film chute 26$^e$, or to developing position, and this is done in this instance by temporarily clutching the upper shaft 39 to the feed shaft carrying the feed roll 26$^b$, over which the film passes, and against which it is yieldingly pressed by a yieldable roller 26$^f$. This can be accomplished in various ways, but in this instance by the following arrangement. It will be noted that the feed shaft which carries roll 26$^b$ is provided on its outer end with a pulley 52 (Figs. 7, 8 and 10), which is connected by a belt 52$^a$ and a similar pulley 52$^b$ mounted on the shaft carrying the take-up spool or reel 26$^e$, so that as the film is unwound from the upper reel and passes through the film chute it will be wound onto the take-up reel. The upper pulley 52 (Fig. 7) is provided on its outer side with a small lever 53 having a shoulder 53$^a$, the lever being pressed inwardly toward the axis of the shaft carrying the pulley by a spring 53$^b$. The end of shaft 39 adjacent the pulley 52 is provided with a pin 53$^c$, which is adapted to engage the shoulder 53$^a$ of lever 53 when the lever 53 is moved inwardly so that the shoulder is in the path of movement of this pin, it being understood that shaft 39 rotates continuously as long as the motor is in operation. However, lever 53 is normally held outward, so that the shoulder is out of the path of movement of the pin 53$^c$, by a pawl 53$^d$ normally pressed inwardly by a spring 53$^e$ (Figs. 4 and 8). At the proper instant this pawl 53$^d$ has its upper end rocked outward so as to disengage lever 53, and this is done by a pin 53$^f$ (Fig. 9) carried by the shaft 48. When the proper movement has been imparted to the film, the shafts are unclutched so as to immediately stop the film movement by the pawl 53ᵈ moving inwardly and by the engagement with the rotating lever 53, causing the latter to be cammed out of engagement with the driving pin 53ᶜ.

Next the exposed portion of the film is developed by the air nozzle 29 directing sprays of the developing, washing, fixing and washing solutions onto the film, the delivery of air through the air nozzle and the movement of the nozzle back and forth over the ends of the tubes 28 which supply the different solutions being controlled through shaft 48. To permit the supply of air to the air nozzle 29, shaft 48 is provided in the valve casing 30 to which air is constantly supplied, as previously explained, with a valve disk 30ᵃ (Fig. 9) having a slot which places the interior or middle portion of the valve chamber 30 (Fig. 9) into communication with the air tube 29ᵈ, connected to air nozzle 29, the air being delivered to the air nozzle 29 in proper timed relation to the movement of the other parts, and being continued for the proper interval, which is determined by the length of the slot in the valve disk 30ᵃ.

The necessary back and forth movement of the air nozzle over the ends of the tubes is accomplished by a cam 54 (Figs. 7, 8 and 9), the side of the cam being engaged by a follower carried by a lever 54ᵃ (Figs. 6, 7 and 8) which in turn is connected to the link 29ᶜ (Figs. 8 and 11) which is attached to holder 29ᵃ carrying nozzle 29. As will be seen by reference to Fig. 11, the link between the lever and carrier 29ᵃ is formed of parts which may be moved relatively for the purpose of adjustment.

As soon as the developing operation is completed, the blast of air is discontinued by the movement of the valve disk 30ᵃ, this step completing the forming of the negative. During the latter part of the negative forming part of the process, clutch member 45 is moved to the left as viewed in Fig. 8, this being accomplished by the action of a cam 55 carried by shaft 48 (Fig. 9) on a pin 55ᵃ of a clutch shifter 55ᵇ secured to a sleeve 55ᶜ, slidably mounted on a rod 55ᵈ, (Fig. 9) which rod is connected to the repeat knob 20 at the front of the casing. This rod carries a shoulder in the form of a sleeve 55ᵉ, so disposed that when the clutch is shifted in the manner just stated, the rod 55ᵈ is moved to the left, as viewed in Fig. 9, moving the repeat knob slightly away from the casing.

As the clutch member 45 is shifted in the manner stated, the motion of the shaft 48 is stopped, and the outer or hollow shaft 49 is rotated, this shaft being instrumental to the movement of the parts used in forming the positive picture, as previously stated. However, the rotation of shaft 49 begins just prior to the stopping of shaft 48, as will be explained presently, the movable clutch member being temporarily in engagement with both companion clutch members just before it leaves the clutch member which drives shaft 48.

The first step in that part of the cycle of operations wherein the positive picture is formed is the movement of a properly sensitized card or blank from the card magazine to a position for exposure and developing. The cards are normally contained in a magazine or compartment 56, and are pressed up against the top wall of this compartment by a presser plate 56ᵃ in the form of a pad, which in turn is pressed upward by a lever 56ᵇ, acted on by a suitable spring 56ᶜ (Figs. 5 and 13). A slidable feeder plate 56ᵈ is arranged at the top of the compartment, this plate having at its upper rear edge a pair of fingers 56ᵉ (Figs. 5 and 13), and these, on the actuation of plate 56ᵈ engage the rear edge of the uppermost card and slide it downwardly between a pair of co-operating oppositely rotating feed rolls 57, which rolls are on a pair of shafts, one of which is constantly rotated as long as the motor is in operation, by means of a shaft 57ᵃ connected by gearing 57ᵇ to the upright motor driven shaft 37 and by gearing 57ᶜ to the feed roll shaft (Figs. 6 and 7).

As the card is moved downwardly and rearwardly it enters a compartment 58 between a swinging platen 58ᵃ and the inclined wall 58ᵇ of the compartment 58, this wall having an opening slightly larger than the sensitized area of the card, which area is exposed through this opening when the card is clamped in position by the platen. The platen 58ᵃ is supported on a spring 58ᶜ, which is secured to a shaft 58ᵈ extending transversely across the upper portion of the compartment 58. The shaft 58ᵈ also has attached to it a spring 58ᵉ, this spring being connected to a swinging frame 58ᶠ, which is loosely supported on the shaft 58ᵈ, this frame being adapted to receive the card which is moved downwardly over the platen 58ᵃ by the rolls 57. The shaft 58ᵈ is actuated simultaneously with the feed plate 56ᵈ, so that while the card is being moved downward into compartment 58, the platen 58ᵃ and the frame 58ᶠ are swung upwardly to receiving position, and when the card enters between the platen 58ᵃ and the inclined wall 58ᵇ, the platen occupies substantially the position shown in Fig. 5. As soon as the card has come down the full distance, further actuation of shaft 58ᵈ causes the spring 58ᶜ to press or clamp the card against the wall 58ᵇ. Both the platen and the wall 58ᵇ have the equivalent of ribs or rails, and it is between these that the cards are clamped.

The card feed and the card receiving and clamping mechanisms are controlled by shaft 49 by means of a cam 59, this cam being fixed to shaft 49 and having a cam groove (Fig. 9), which is engaged by a pin on a bell-crank lever 59ᵃ (Figs. 6, 7 and 8), this lever being connected by a link 59ᵇ to a gear segment 59ᶜ, which engages a segment 56$^f$ on a rock shaft 56$^g$ (Fig. 6), carrying slotted arms 56$^h$ (Figs. 5 and 13) which actuate the card feed plate 56$^d$.

Additionally the cam actuated gear segment 59$^e$ is engaged by a gear segment 58$^g$ which is mounted on the shaft 58$^d$ which swings the card-clamping platen 58$^a$ and the card receiving frame 58$^f$, as previously explained.

The sensitized portion of the card is now ready for the exposure, and this is done by causing the light to pass from lamp 23 through the film and through a lens in a lens holder 60, which is between compartments B and C or between the portion of the film in the film chute and the card which is positioned for exposure and developing. It will be noted from Fig. 5, that when the card is in the position just stated, it is in parallel relation to, and downwardly and forwardly from the portion of the film in the film chute 26$^c$.

A series of shutters are actuated to permit or cause this exposure. A cylindrical shutter is employed for the lens in holder 60. It will be noted by reference to Fig. 5, that the lens holder is in a fixed tube 60$^a$, provided with diametrically opposite openings, and that within this fixed tube is a rotary tube 60$^b$, also provided with diametrically opposite openings. These openings, however, are normally displaced from the openings in the fixed tube 60$^a$, and are brought into registration therewith by rotating the inner tube. Additionally there is a swinging trap door 61, which normally closes the upper rear opening of the fixed tube 60$^a$, this door being in the film developing compartment, and its chief function being to keep the solutions used in developing the film from getting onto the lens. This door is swung upwardly on the opening of the shutter in a manner to be presently explained.

Furthermore, the side of the film developing compartment B alongside the lamp 23 has a swinging shutter 62 (Fig. 3), this shutter being in the form of a slide carried by an arm 62$^a$ rotatable on a stud which is opposite the ends of, and concentric with respect to the shutter tubes 60$^a$ and 60$^b$. (Figs. 3 and 5).

On the opening of shutter 62, the light from lamp 23 may pass through the shutter opening into that portion of the film compartment which is above and to the rear of the film chute. I provide in this portion of the compartment a reflector 62$^x$ (Fig. 5), which directs the light through the portion of the film in the film chute, past the trap door 61, which is now open, through the lens in the lens holder 60 (the rotary shutter 60$^b$ now being open) and onto the sensitized portion of the card which is in position for exposure and developing.

When the card is exposed for a predetermined interval, the shutters are closed.

The shutters are controlled by shaft 49, through the medium of a cam 63, which is carried on the side of cam 59. This cam actuates a lever 63$^a$ (Figs. 6 and 7), which is connected by a link 63$^b$ to a gear segment 63$^c$, engaging a pinion 63$^d$ on a shaft 63$^e$, on which the inner shutter tube 60$^b$ is mounted. The end of shutter tube 60$^b$, opposite to that connected to shaft 63$^e$ (Fig. 3), is suitably connected or so related to the swinging shutter arm 62$^a$ as to swing it to open and closed positions, when the shutter tube is rotating to open and closed positions, and this is accomplished in this instance by providing on the end of shutter tube 60$^b$ an extension in the form of a lug or finger 60$^c$, which projects into an arc-shaped notch of a disk-like hub 62$^b$ of arm 62$^a$, forming a lost motion connection between these parts. The finger 60$^c$ of the inner shutter tube carries a pawl 60$^d$, so arranged that on the opening movement of the inner shutter tube and shutter slide 62, this pawl engages a pin 61$^a$ on the outwardly protruding end of shaft 61$^b$ carrying the trap door 61. On the reverse movement a pawl 62$^c$ on the hub 62$^b$ of arm 62$^a$ engages the finger 61$^a$ on the trap door shaft so as to close the trap door.

The effect of this arrangement is that when cam 63 rocks the lever 63$^a$ and causes the rotation of shaft 63$^e$ connected to the inner rotatable shutter tube 60$^b$, not only is the cylindrical shutter surrounding the lens and lens holder 60 opened, but substantially simultaneously therewith the shutter 62 and trap door 61 are opened. On the completion of the exposure period for the positive picture, the shutters and trap door 61 are automatically closed, this being controlled by the cam 63, although the actual movements are imparted by a spring 63$^f$ (Fig. 4), which restores the gear segment 63$^c$ and parts connected therewith to normal position when permitted so to do by the cam 63.

The operating face of cam 63 which engages the co-operating part of bell-crank lever 63$^a$ is adjustable, so that the length of the exposure period can be varied as desired, the adjustment of the operative face of cam 63 being similar to that on cam 50 which determines the length of exposure of the film.

The image for the positive picture now having been formed on the card, the picture is completed by automatically developing the exposed sensitized portion of the card. This developing is accomplished by means similar to that used in developing the film, i. e. by directing by means of a moving air nozzle, sprays of developing, washing and fixing solutions onto the exposed surface of the card, the solutions being supplied by means of tubes extending down to the receptacles containing the developing, washing and fixing solutions already referred to. The three tubes which supply the solutions for developing, washing and fixing the exposed card are shown at 64 in Fig. 6. As shown in Fig. 5, the inner ends of these tubes are close together and are held in horizontal position by a holder 64ª. Extending down into this holder and above and slightly forward of the ends of the tubes is the movable air nozzle 65, carried by a sliding holder 65ª, carried by a plate 65ᵇ, having a curved slot which determines the path of movement of the holder and nozzle. The nozzle 65 is connected to an air tube 65ᶜ (Figs. 6, 7 and 11) which extends up to, and communicates with the casing 30 of the air valve. Air is permitted to pass from the interior of the casing to this air tube 65ᶜ by a valve disk 30ᵇ, which is similar to the valve disk 30ª (Fig. 9). This valve disk 30ᵇ is carried by shaft 49, and is provided with a slot through which the air passes to the air tube 65ᶜ, and the length of which determines the length of time that the developing, washing and fixing operations occur.

The air nozzle 65 and its holder 65ª are moved back and forth so that the stream of air will at the proper instants and at the proper intervals of time be directed across the ends of the tube 64, by means of a cam 65ᵈ carried by shaft 49 (Fig. 9) and engaged by a follower of a lever 65ᵉ, this lever being supported in a bracket 65ᶠ (Figs. 6 and 7), and being acted on by a spring 65ᵍ which keeps the follower in engagement with the face of the cam. The follower referred to is in the form of a pin 65ʰ (Fig. 8) carried by an arm 65ᵏ, which extends inwardly from the pivot of the lever, as will be clear from Fig. 8.

The positive picture now having been developed, platen 58ª and frame 58ᶠ swing downward, releasing the card from the inclined wall 58ᵇ of compartment 58, and as the frame swings downward the back of the card engages a pair of fixed prongs 58ᵐ (Fig. 5) which push the card off of a shelf 58ʰ, and the card, bearing the now finished picture, drops through a slot in the lower wall of compartment 58 and slides down the inclined front face of the stand 13 to the position shown in Fig. 1. Simultaneously with the discharge of the card bearing the finished picture, the card feed plate 56ᵈ is restored to its normal position, with its feed fingers 56ᵉ in position to engage the top card on the next forward stroke or the next cycle of operations. The discharge of the card in the manner just explained, and the return of the feed plate are accomplished by the rocking of the two segments 56ᶠ and 58ᵍ by the segment 59ᶜ, the movement being imparted to this segment by the cam 59 already explained.

I have found it desirable to provide between the compartment 58 and the feed rolls 57, the equivalent of a curtain or shield 66 which prevents the passage into the film magazine of spray of any of the solutions used in developing the positive picture, but which is automtically shifted to allow the passage of a card from the magazine to developing position, and automatically comes back to normal position, shown in Fig. 5, when the card reaches that position. This can be done in various ways, but in this instance the shield 66 is connected to the curved arms 66ª (see Fig. 15) of a shaft 66ᵇ journaled in the framework. This shaft has fixed to it an upstanding finger 66ᶜ (Figs. 5, 14 and 15) with an extension 66ᵈ. A spring 66ᵉ is connected to the end of this finger (Figs. 14 and 15) so as to normally hold the shield in the position shown in Figs. 5 and 15. In this position the shield would block the movement of a card forwardly from the feed rolls to developing position, but provision is made for swinging the finger 66ᶜ forwardly so as to lower the shield out of the path of movement of the card as the latter is moved by the rolls 57 to developing position. To do this, the card feed slide 56ᵈ is provided with an upstanding boss to which is fixed a pin 66ᶠ (Figs. 5, 13 and 14), the forward end of which is flexible and has a laterally bent portion 66ᵍ. In the path of movement of this laterally bent end 66ᵍ is a stationary cam block 66ʰ (Fig. 5) so disposed that as the card is fed forwardly from the magazine toward the feed rolls 57, the end 66ᵍ of the pin engages the rear tapered face of the cam block and is cammed down so as to ride along the lower face of the block and engage the extension 66ᵈ of finger 66ᶜ, thereby swinging the shaft 66ᵇ and lowering the curtain or shield 66. Immediately after the curtain is lowered, the card reaches the feed rolls and is moved forwardly and downwardly onto the frame which is adapted to receive it. As soon as the card passes the feed rolls, the end 66ᵍ of pin 66ᶠ rides off the pin extension 66ᵈ, whereupon the curtain is swung back to normal position by the spring 66ᵉ. On the return movement of the feed slide 56ᵈ, the end 66ᵍ of pin 66ᶠ engages the forward tapered end of cam block 66ʰ and is cammed up and rides over the top surface of the latter so as to clear the pin extension 66ᵈ. It might be stated that the curtain or shield 66 is not only connected to the arm 66ª of shaft 66ᵇ, as shown in Fig. 15, but additionally it is connected to links 66ᵏ which guide it in such a way that when moved from normal position it swings downwardly and toward the front beneath the lower feed roll 57.

The curtain or shield is a feature which may be employed as a precautionary measure in the way of protection to the cards in the card magazine, but I do not regard it as essential, and it may be omitted, or some other means may be employed for this purpose.

The entire cycle of operations has now been carried out, and the machine is automatically stopped through the action of a switch which automatically opens the motor circuit and the circuit of lamp 23, this occurring on the discharge from the machine of the card bearing the finished picture and the return to normal position of the card-feeding member 56$^d$. The switch in question is preferably a double-pole switch, located in the upper part of the case above the camera box 25, and it includes two stationary contacts 67 (Figs. 3 and 4) adapted to be engaged by contacts carried by two flexible blades 67$^a$ (Figs. 4 and 8) carried by a pivoted armature 67$^b$, which is arranged at the top of an upright magnet 67$^c$ (Figs. 3 and 4) which is energized upon the closure of the two switches which set the machine in operation, as described in the early part of the specification. Attached to this armature is a plate 67$^d$ (Figs. 4, 6, 7 and 8) which extends laterally and then downwardly over the cams. When the machine is idle, that is to say, whenever the sequence of operations has been completed, and the machine automatically stopped in the manner stated, the lower edge of this plate engages in notches 67$^e$ of the circular disks forming a part of cams 54 and 65$^d$, the former being on shaft 48 and the latter on shaft 49. These two notches are indicated in Fig. 9, and the lower edge of the plate is shown to be in the notches in Fig. 7. The plate is biased toward this position by gravity and by the action of a spring 67$^f$, indicated in Fig. 4, but when the magnet 67$^c$ is energized, the armature 67$^b$ and this plate 67$^d$ are rocked so that the latter is disengaged from the notches 67$^e$. The arrangement is such that when the two switches which are closed to set the machine in operation are operated, the magnet 67$^c$ is energized so as to disengage the plate from these notches. The closure of the motor and lamp circuits at the contacts 67 starts the machine in operation, causing first the rotation of the inner shaft 48 carrying cam 54, and therefore its notch 67$^e$ rides past the lower end of plate 67$^d$. The operator and attendant may now release the switches which started the machine in operation, for though the opening of these switches de-energizes magnet 67$^c$, the motor and lamp circuits remain completed at the contacts 67 for the reason that the circular portion of cam disks 54 which the lower end of plate 67$^d$ now engages, prevents the circuit being opened at 67. That is to say, it holds the plate, armature and contact members 67$^a$ in the position to which they were moved when the magnet was energized.

Shaft 48 continues to rotate until it has made one complete rotation and is stopped by movement of clutch member 45, with the notch 67$^e$ of cam disk 54 in the position it previously occupied, but the circuits are not opened at contact 67 at this time because though the notch 67$^e$ in cam disk 54 again is brought into registration with the lower end of plate 67$^d$, just before this occurs, shaft 49 begins to rotate, and the notch 67$^e$ in the cam disk 65$^d$ is carried away from the lower edge of the plate, and it is not until the outer shaft 49 makes a complete rotation, or until notch 67$^e$ comes into line with the similar notch in the now stationary disk 54, that the lower end of plate 67$^d$ is capable of dropping into these notches. That is to say, it is not until they are brought into alignment that the plate 67$^d$ may be rocked by spring 67$^f$ so as to open the circuit and stop the motor. This occurs as already stated, when the sequence of operations is completed by the delivery from the machine of the card bearing the finished picture.

When the machine is stopped, clutch member 45 is in its left hand position as viewed in Fig. 8. That is to say, when the motor is stopped on the completion of the cycle of operations, it is still geared to the outer shaft 49, the repeat knob 20 having been pushed outward, as previously explained. Therefore, if a duplicate positive picture is desired it is only necessary for the operator and attendant to close their respective switches which energize magnet 67$^c$, and again start the machine in operation. Now, however only that part of the cycle of operations is carried out which is necessary for making the positive picture from the negative,—that is to say, the operations of exposing the film, moving the film to developing position and of developing the film are eliminated, and the sequence of operations as carried out begins with the rotation of shaft 49, and the positive picture-forming steps which are caused or controlled by the rotation of said shaft. The machine comes to a stop upon the delivery of the second picture from the machine.

This can be repeated as many times as desired, so that from one film as many positive pictures can be obtained as may be desired by any particular subject.

When a new picture is to be made, it is only necessary to push in the repeat button 20. This restores the movable clutch member 45 to position to engage the clutch member connected to gear 44. In other words, when the machine is again operated, after the repeat button has been pushed in, the entire series of operations will be carried out, beginning with the rotation of shaft 48, which is instrumental in causing the various operation to be performed necessary to complete the negative followed by the rotation of shaft 49 which controls the positive picture-forming steps.

At this point I wish to make clear the fact that while I now believe it desirable that the machine be set into operation by the actuation of two switches, the machine can b started just as effectively by the actuation of a single switch, whether manually operated or whether operated in some other manner, such as through a suitable coin-controlled mechanism, the adaptation of which to this particular use would be obvious.

Furthermore, although with the present embodiment of the invention as herein illustrated and described, the machine comes to a stop automatically on the delivery of each positive picture, the latter is not an essential feature or characteristic of the machine. On the other hand, in the production of duplicate positive pictures from the same negative, it may be desirable to have the machine run continuously in the production of a given number of positive pictures. To accomplish this, it is only necessary to provide a push button or equivalent device for preventing the opening of the coil-controlled switch upon the completion of the first positive picture, and as long as this switch is held closed in this manner, the machine will continue to run, turning out one positive picture after another until said switch is permited to open.

It is feasible also, to provide a device which can be set to hold the switch closed until a given number of duplicates have been produced, and then to automatically open. For example, if the particular subject desires six pictures, this device could be set to stop the machine when it has turned out six pictures, all produced from the same negative. Or if the subject should desire a different number of positive pictures, the device could be set so as to cause the machine to operate, and then to stop the machine when the desired number of pictures were made and delivered from the machine.

Of course, before the machine is set into operation it is essential that it be loaded with a film (assuming that a film is used), and that the magazine 56 be provided with a quantity of sensitized cards. The application or removal of the film is rendered easy by providing at the top of the compartment receiving the unexposed film, a hinged door 68, and at the rear of the film-developing compartment a hinged or otherwise removable door 69.

In Fig. 13 I have shown the manner in which the magazine may be loaded with cards. The cards when in the magazine are held in a container 70, which is open at the top to permit the feed of cards therefrom, and at the bottom has an opening of sufficient size to permit the free action of the pressure pad 56$^a$. To load the magazine the pad 56$^a$ must be lowered, and this is done by pulling out a rod 70$^a$, slidably mounted in the machine, having a bifurcated part which straddles the lever 56$^b$ (Figs. 5 and 13). The inner end of the bifurcated part carries a roller 70$^b$, which is adapted to ride over the upper surface of the lever 56$^b$, which is curved as shown, the arrangement being such that when the rod 70$^a$ is pulled out, the roller pulls down lever 56$^b$, and this depresses pad 56$^a$ to the bottom of the card compartment or magazine 56.

Prior to the insertion of the container 70, containing a quantity of the cards, into the compartment 56, the cards and the container 70 are contained in a box 71, this box being open at its ends, but rendering the container 70 light-tight. The end of the box 71 is inserted in the end of compartment 56 and then the container 70 with the cards is simply pushed into the compartment, and after the box or case 71 is withdrawn, the rod 70$^a$ is pushed inward, whereupon the pad 56$^a$ lifts the stack of cards up against the top of the compartment, and the machine is ready to operate.

When the cards in the magazine or compartment 56 are exhausted, the rod 70$^a$ is pulled outward, lowering the pad, and the loading operation is repeated by shoving into the end of the compartment the end of a case 71 containing a container 70, filled or substantially filled with cards, and again shoving the container and the cards inward to the position shown in Fig. 13, withdrawing box 71, and again shoving in rod 70$^a$.

The above described automatic feed mechanism for the sensitized cards is utilized in the preferred construction when the machine is to be wholly automatic. However, I contemplate simplifying the machine somewhat by rendering it semi-automatic to the extent of having the cards inserted one at a time by hand. To do this it is only necessary to place the sensitized cards in holders similar to plate holders used in ordinary cameras, and at each operation of the machine to slide one of these holders into the side of the machine in the same manner that a photographer inserts a plate holder in a camera, and when thus inserted, the card will occupy the same position that it will occupy when the machine is equipped with the above described automatic card feed mechanism. When the cards are inserted by hand, as above stated, it will be understood, of course, that all the card feeding and card discharging or ejecting mechanism, as well as the cam movements necessary to operate it, shown especially in Figs. 5 and 6, may be eliminated.

At the early part of the specification it was stated that though this machine is equipped to form the negatives on the film in strip form, the negatives might be formed on a strip of paper. When a film is used, the light utilized in forming the positive picture is passed through the film. If the negative is formed on a strip of paper, it is simply necessary to admit the light from lamp 23, under or in front of chute 26, instead of back of it, in which event the light will be directed onto the negative and reflected from it through the lens in holder 60 as before, or the light may be admitted both in front and behind the paper, in which event part will be reflected from the front of the developed negative, and part will pass through the negative, which will generally be translucent, and by this double action an image of more depth and less flatness is produced on the card.

To accomplish this it is only necessary to provide an auxiliary shutter opening 72 (see Fig. 3) in the wall of the film compartment B, so that the light may enter in front of the film chute 26 as well as behind it. A sliding pivoted door 72ª is provided to cover this auxiliary opening 72, and this opening remains covered as long as a transparent film is used. On the other hand, when the negative is formed on a translucent strip, such as paper, this opening will be uncovered by the operator swinging the door 72ª, in which event when the main shutter 62 is opened, light will pass from the lamp through the main shutter opening to the rear of the negative, as well as through the auxiliary shutter opening 72 onto the front face of the negative. It might be stated that the shutter 62 is large enough to cover, and when moved to open position to uncover, both the main shutter opening and the auxiliary opening 72ª, as is apparent from Fig. 3.

In Fig. 16 I have shown a diagram of electric circuits which may be employed to advantage. In this instance the current for operating the motor and for energizing the lamps and magnetically controlled switch is supplied from a pair of conductors 73. The operator's switch, which I contemplate using, is shown at 74, and the subject's switch, referred to above, is shown at 75. In this figure I have shown also the motor 33, the lamp 23, and the magnetically controlled switch with its stationary contact 67, switch blades 67ª and magnet coil 67°. Additionally, I have shown in this figure a lamp 76 for illuminating the subject, or to give the necessary light to make the first exposure. It will be observed that this lamp is connected to the conductor 73 through the switch 74, and is energized on the closure of said switch.

The subject's switch 75 is in a circuit with magnet coil 67°, being connected to the current supplying conductors through switch 74 by means of conductors 77, 78 and 79, the latter here shown as containing a resistance 80.

The motor 33 and lamp 23 are here shown in shunt to each other, and in a circuit connected by conductor 81 to one of the current-supplying conductors, by conductor 82 to one of the blades 67ª, the associated stationary contact of which is connected by conductor 83 to the other main current supplying conductor. The magnet coil 67° is also in a circuit independent of the subject's switch 75, and composed of conductor 84, one of the switch blades 67ª, and conductor 79.

From this diagram, it will be seen that when the operator closes the switch 74, the lamp 76 is energized, and when the subject closes the switch 75, the magnetically operated switch is closed, starting the motor 33 and energizing lamp 23. The operator will keep the switch 74 closed until the exposure period is completed, but the subject may release or open switch 75 as soon as it has been closed, but the motor 33 and lamp 23 remain energized until the sequence of operations is completed, regardless of whether the sequence includes the making of the negative and positive picture, or a duplicate positive picture only. The second circuit for the coil 67°, independent of switch 75, is provided so as to prevent the coil being de-energized before the mechanism is started sufficiently to cause the magnetically operated switch to be held closed mechanically in the manner already explained, it being understood, of course, that the coil 67° is de-energized as soon as the switches 74 and 75 are opened, and, in fact, as soon as switch 74 is opened, if, perchance, the subject should keep the switch 75 closed an unneccessary length of time.

In Fig. 17 I have shown somewhat conventionally the strip on which the negative images are produced, which strip, as already stated, may be a transparent film, or a translucent strip, in which event it may be formed of paper or other suitable material. In this figure I have illustrated the fact that successive portions of the strip are exposed and then developed and fixed. The upper unshaded part 26ˣ of the strip represents the sensitized unexposed portion which is fed from the upper spool. Below this I show a shaded portion 26ʸ which represents an undeveloped but exposed portion, this portion being exposed in the camera. Below this I have shown several images 26ᶻ which represent successive developed portions.

In describing the machine I have also described its operation and the function of the different parts so that a detailed statement of the operation would only be a repetition of the description of the operation already set forth. It will therefore be sufficient to state that the subject whose picture is to be taken, sits before the machine and when ready for the exposure, starts the machine in operation. When the exposure is completed the subject is notified of this by the visual signals, and in a very short period of time the finished picture is delivered from the machine, which can be followed by the production of as many duplicates as may be desired by the subject. The steps of exposing the film or negative, of shifting the negative to developing position, developing the negative by directing onto it successively the sprays of atomized developing, washing, fixing and washing solutions, followed by the feeding of the sensitized card for the positive picture to the exposure in developing position, the exposure of the card from the negative, the developing of the positive image and the delivery of the positive picture from the machine all take place in rapid succession, so that little time is required from the beginning to the end of the cycle of operations. Of course, the reproductions are produced one after another in a much shorter space of time.

In this machine I have embodied what I believe to be broad new principles. For example, I believe I am the first to produce in a practical automatic machine, an unreversed picture or positive picture, and the first to provide in a machine of this character, provision for turning out duplicate copies of the same picture. Additionally, I believe I am the first to provide in a machine of this or any other kind, the method of developing by directing onto the exposed surface in atomized condition, the developing, washing and fixing solutions necessary to produce a developed image. This method is particularly efficacious in my improved machine, not only because the particular method of developing utilized, allows the complete developing operation to be carried out quickly and effectively by the enhanced oxidizing action due to the atomized solutions, but as already pointed out, it allows me to form a positive picture on any localized area of the card, and the solutions need not come in contact with any portion except that which is sensitized, wherever it may be located. As this process is carried out by me, the area of the sensitized portion corresponds exactly with the desired size of the picture, and the sensitized portion is wholly within the margin. This is desirable for many reasons, among which might be mentioned that it leaves the surrounding surface clean, and there is minimized the liability of the sensitized cards being light struck in loading or preparing for the loading of the machine.

These and other broad principles can be applied in various specifically different ways, or by many different forms of mechanisms, the particular mechanism shown being illustrative of one of the many forms that my invention may assume. I therefore do not desire to be confined to the precise details or arrangements shown, but aim in my claims to cover all modifications which do not involve a departure from the spirit and scope of my invention as set forth in the appended claims.

Having described my invention, I claim:

1. In a photographing machine, means for causing an exposure on a sensitized element for the production of a negative, means for moving the same to a position for development and reproduction, means for developing the same, and means for causing an exposure from the negative on a second sensitized element for the production of a positive while the negative is in development position.

2. In a photographing machine, means for causing an exposure on a sensitized element for the production of a negative, means for developing it, means for causing a positive image to be produced from the negative on a second sensitized element, and means for developing the latter while in exposure position to produce a positive picture.

3. In a photographing machine, a holder for a sensitized element for the production of a negative, a shutter for controlling the exposure of said sensitized element, a holder for a sensitized card for a positive picture, a shutter for controlling the exposure of the card, devices for developing the sensitized element for the negative and the sensitized card for the positive, and means for causing the action of the first-mentioned shutter to cause the exposure of the sensitized element, the actuation of the holder therefor so as to move the exposed element to developing position, the actuation of the developing means so as to complete the negative, the actuation of the second mentioned shutter to cause the exposure on the card while the negative is in developing position, and the actuation of the developing means for completing the positive picture.

4. In an automatic photographing machine, a holder for a sensitized element for the production of a negative, a camera by which an exposure is made on said element, means for moving the exposed element, means for developing the exposed surface to form a negative, means for causing a positive image to be formed on a sensitized blank by light passing from the negative to the blank, means for causing the development of the exposed blank while the latter is in exposure position, and a motor by which all said means are operated.

5. An automatic photographing machine having means for producing a negative and from the negative a positive picture, including a camera, devices for causing the actuation thereof to cause an exposure on a sensitized element for the negative, a movement of the exposed portion from the camera, the development of the exposed surface to produce the completed negative, the exposure of a blank for a positive picture and the development of the blank to complete the positive picture, motive means for actuating all said devices, mechanism by which the complete cycle of operations for the production of the negative and positive picture are carried out, and means whereby that portion of the cycle of operations for the production of the positive picture may be repeated independently of the negative forming operations.

6. A photographing machine having means for causing the exposure of a portion of a sensitized flexible strip for the production of a negative, the feed of the strip, the development of the exposed portion thereof to complete the negative, the exposure of a sensitized blank for producing a positive picture from the negative and the development of the positive picture, and having means whereby the sequence of operations for producing the positive picture may be repeated as often as desired so as to produce duplicate positive pictures from the same negative.

7. In a photographing machine, a motor and parts driven and operated thereby for causing automatically the exposure of a sensitized element, the development of the same to form the negative, the formation of a positive image on a blank from the negative, the development of the positive picture, and means adapted to be actuated to cause the motor to operate said parts so as to cause the entire sequence of operations to be carried out, or to cause a repetition of the positive picture forming portion of the sequence, whereby one or more duplicate positive pictures may be produced from the same negative.

8. In a photographing machine, means for causing an exposure on a sensitized surface, and means for subsequently directing onto the exposed surface air streams carrying finely divided solutions to develop it.

9. In a photographing machine, means for causing an exposure on a sensitized surface, and means for thereafter directing successively onto the exposed surface different atomized solutions for developing and fixing the exposed surface.

10. In a photographing machine, means for causing an exposure on a sensitized surface, means for shifting the exposed surface from exposing position to developing position, means for developing the surface to form a negative and means for causing an exposure from the negative while in developing position onto a second sensitized surface to form a positive.

11. In a photographing machine, means for forming an exposure on a sensitized strip, means for moving the strip to bring the exposed surface to developing and printing position, means for developing the surface and means for causing an exposure from the negative while in developing position on a second sensitized surface adapted to form a positive picture.

12. In a photographing machine, means for forming an exposure on a sensitized surface, means for moving the exposed surface to developing and printing position, means for developing the surface, means for causing an exposure from the negative while in developing position onto a second sensitized surface for a positive, and means for developing the second exposed surface while in exposure position.

13. In a photographing machine, means for causing an exposure on a sensitized surface, and means for forcibly blowing onto the exposed surface finely divided solutions to develop it.

14. In a photographing apparatus, means for causing an exposure on a sensitized surface, and means for then developing the exposed surface by directing onto the same air streams containing in finely divided form the necessary solutions to develop and fix the negative.

15. In a photographing machine, means for causing the exposure of a negative, and means for successively directing onto the exposed surface air streams containing finely divided developing, washing and fixing solutions.

16. In a photographing machine, means for causing the exposure of a negative, delivery means for developing solutions, and means associated therewith for atomizing the solutions and blowing them onto the exposed surface.

17. In a photographing machine, means for causing the exposure of a negative, delivery means for developing solutions, and air delivery means associated therewith for directing sprays of the solutions onto the exposed surface.

18. In a photographing apparatus, means for forming an exposure on a sensitized photograph surface, tubes for delivering air and developing solutions, and means for causing a relative movement between the two so as to cause atomized solutions to be directed onto the exposed surface.

19. In a photographing machine, means for causing an exposure on a sensitized surface, containers for developing solutions with delivery means extending therefrom, a source of air supply, and means for causing a stream of air to be directed in proximity to the delivery means so as to cause atomized solutions to be directed onto the exposed surface.

20. In a photographing machine, means for forming an exposure on a sensitized surface, containers for developing solutions with tubes extending therefrom, a source of air and a delivery tube, and means for causing the movement of the air delivery tube in proximity to the ends of the first-named tubes, whereby streams of atomized developing solutions are directed onto the exposed surface.

21. In a photographing machine, means for causing the exposure of a sensitized element for a negative, a holder for a sensitized blank on which the positive picture is adapted to be formed, a chamber adjacent the first means and adjacent said holder and adapted to receive the exposed sensitized element, means for developing the exposed surface while in said chamber to form the negative, means for automatically admitting light to the chamber, a reproducing lens, and an automatically operated shutter for causing a positive image to be formed from a negative.

22. In a photographing machine, means for causing the exposure of a negative, a developing chamber adjacent thereto, means for causing the development of the negative in the chamber, a holder for sensitized blanks for forming positive pictures, a developing chamber therefor, a lamp, an automatically actuated shutter between the chambers for causing a positive picture to be formed from the negative by light passing from the lamp, and means for developing the positive.

23. In a photographing machine, a camera having a lens and a shutter, a developing chamber adjacent the camera, means for automatically moving the exposed portion of a sensitized strip or ribbon from the camera into said chamber and means for developing the exposed portion in said chamber while the strip is stationary.

24. In a photographing machine, a camera by which an exposure is made on a sensitized member in the form of a strip or ribbon, a chamber adjacent the camera, means for automatically moving the exposed portion of the strip or ribbon from the camera to the chamber, and means for automatically developing the exposed surface while in stationary position in said chamber.

25. In a photographing machine in which an exposure is made for a negative and a positive picture is produced from the negative, a camera having a lens, a shutter and a camera box through which a sensitized strip or ribbon is adapted to be moved, a chamber adjacent the camera box, means for moving the exposed portion of the strip or ribbon from the camera box into the chamber, means for developing the exposed surface while in stationary position in the chamber, and means for forming an exposure from the negative thus formed while in developing position on a sensitized blank from which the positive picture is produced.

26. In a photographing machine, a camera through which a sensitized strip is adapted to be passed, feed and take-up spools for the strip, a chamber adjacent the camera box, means for causing a feed of the strip so as to move a portion of the strip intermediate the spools from the camera to said chamber, and means for developing and fixing the exposed surface while the same is in stationary position in said chamber independently of the remainder of the strip.

27. In a photographing machine, a camera including a shutter, a lens, a camera box and feed and take-up spools for a sensitized strip which is adapted to pass through the camera box, a chamber located adjacent the camera box, means for moving the strip after a portion thereof in the camera box has been exposed, to developing position in said chamber, means for developing and fixing the exposed portion while in stationary position in said chamber independently of the remainder of the strip, and means for causing an exposure to be made from the developed portion onto a sensitized blank on which a positive picture is formed.

28. In a photographing machine, a camera including a shutter, a lens, a camera box, feed and take-up spools for a sensitized strip adapted to be passed through the camera box, a developing chamber adjacent the box, means for actuating the strip so as to cause a portion thereof exposed in the camera box to be moved to developing position in said chamber, means for developing and fixing the exposed portion of the strip so as to form a negative, means for receiving a sensitized blank on which a positive picture is adapted to be formed, means for forming an exposure on the sensitized blank to form the image for the positive picture, and means for developing and fixing the exposed surface of said blank while in exposure position.

29. In a photographing machine, a camera including a shutter, a lens and a camera box, a chamber adjacent the camera box, means for causing a sensitized member exposed in the camera box to be moved from the latter to the chamber, means for developing the exposed member while in said chamber to form a negative, a second chamber adjacent the first-named and having an opening adapted to be closed by a sensitized blank on which a positive picture is to be formed, a reproducing lens, a shutter therefor, and means for admitting light so as to illuminate the negative while in the first-named chamber and for operating said second-mentioned shutter so that light may pass from the negative through the reproducing lens onto the exposed blank in the second chamber.

30. In a photographing machine, a camera including a shutter, a lens and a camera box, a chamber adjacent the camera box, means for causing a sensitized member exposed in the camera box to be moved from the latter to the chamber, means for developing the exposed member to form a negative, a second chamber adjacent the first-named and having an opening adapted to be closed by a sensitized blank on which a positive picture is to be formed, a reproducing lens between said chambers, a shutter for said reproducing lens, means for admitting light so as to illuminate the negative and for operating said shutter so that light may pass from the negative through the reproducing lens onto the exposed blank, and means for developing said blank while in exposure position.

31. In a photographing machine, a camera, a chamber adjacent the camera, means for moving a sensitized member exposed in the camera from the latter to said chamber, means for developing the exposed member while in said chamber to form a negative, a reproducing chamber adjacent said first-named chamber and adapted to receive a sensitized blank on which a positive picture is to be formed, and means for admitting light to the first-named chamber and for causing it to pass from the latter to the second-named chamber for the exposure to produce a positive image from the negative.

32. In a photographing machine, a camera, a chamber adjacent the camera, means for moving a sensitized member exposed in the camera from the latter to said chamber, means for developing the exposed member while in said chamber to produce a negative, a reproducing chamber adjacent said first-named chamber and adapted to receive a sensitized blank on which a positive picture is to be formed, and means for admitting light to the first-named chamber both in front of and behind the developed negative so that it will be directed through and from the negative onto the exposed surface of the blank in the second-named chamber.

33. In a photographing machine, a camera, a chamber adjacent the camera, means for moving a sensitized member exposed in the camera from the latter to said chamber, means for developing the exposed member while in said chamber, a reproducing chamber adjacent said first-named chamber and adapted to receive a sensitized blank on which the positive picture is to be formed, means for admitting light to the first-named chamber, and a shutter-controlled reproducing lens between said chambers.

34. In a photographing machine having a camera adapted to accommodate a sensitized strip, feed and take-up spools for the strip, and means for successively exposing a portion of the strip and developing and fixing the photographic image thereon before the next exposure is made on the strip.

35. In a photographing machine having a camera adapted to receive a sensitized strip, feed and take-up spools for the strip, means for operating the camera so as to cause successive portions of the strip between the spools to be exposed, means for feeding the strip, and means for developing and fixing each exposed portion following the exposure and before the next exposure is made.

36. In a photographing machine, a camera adapted to receive a sensitized strip, feed and take-up members for the strip, and means for successively and intermittently exposing, developing and fixing successive portions of the strip.

37. In a photographing machine, a camera adapted to receive a sensitized strip, feed and take-up members for the strip, means adjacent the camera for developing and fixing the exposed portions of the strip, means for successively causing a portion of the strip to be exposed in the camera, a movement of the strip so as to bring an unexposed portion thereof into the camera and the exposed portion to developing position, and the developing and fixing of the image while in said position.

In testimony whereof, I hereunto affix my signature.

GEORGE N. PIFER.